US009036338B2

United States Patent
Backus

(10) Patent No.: US 9,036,338 B2
(45) Date of Patent: May 19, 2015

(54) SUPPORT FRAME FOR HIGH DEFINITION FIELD MONITOR

(71) Applicant: SmallHD, LLC, Cary, NC (US)

(72) Inventor: Dale C. Backus, Apex, NC (US)

(73) Assignee: SmallHD, LLC, Cary, NC (US)

( * ) Notice: Subject to any disclaimer, the term of this patent is extended or adjusted under 35 U.S.C. 154(b) by 177 days.

(21) Appl. No.: 13/841,798

(22) Filed: Mar. 15, 2013

(65) Prior Publication Data

US 2013/0270976 A1     Oct. 17, 2013

Related U.S. Application Data

(60) Provisional application No. 61/624,451, filed on Apr. 16, 2012.

(51) Int. Cl.
G06F 1/16      (2006.01)
A47B 81/06    (2006.01)

(52) U.S. Cl.
CPC .............. *A47B 81/06* (2013.01); *G06F 1/1601* (2013.01)

(58) Field of Classification Search
USPC .................................................... 361/679.21
See application file for complete search history.

(56) References Cited

U.S. PATENT DOCUMENTS

| 8,340,787 | B2 * | 12/2012 | Yoshikawa et al. | 700/17 |
| 2005/0105259 | A1 * | 5/2005 | Lee et al. | 361/681 |
| 2006/0018092 | A1 * | 1/2006 | Nagano | 361/687 |
| 2008/0013267 | A1 * | 1/2008 | Chang | 361/681 |
| 2008/0079861 | A1 * | 4/2008 | Seo et al. | 349/58 |
| 2009/0225502 | A1 * | 9/2009 | Cheng et al. | 361/679.01 |
| 2009/0261694 | A1 * | 10/2009 | Yamanaka | 312/7.2 |
| 2013/0107127 | A1 * | 5/2013 | Yokawa et al. | 348/725 |

* cited by examiner

*Primary Examiner* — Lisa Lea Edmonds
(74) *Attorney, Agent, or Firm* — Myers Bigel Sibley & Sajovec

(57) ABSTRACT

A frame for a field monitor includes a front panel having a central opening, and a rear panel attached to the front panel in adjacent, spaced-apart relationship to define a receptacle for receiving and supporting a field monitor therein. The receptacle includes a substantially open periphery which provides access to cable ports and other controls on the monitor. The rear panel includes opposite first and second sides and a plurality of legs extending outwardly from the first side. Each leg is attached to the front panel so as to maintain the front and rear panels in adjacent, spaced-apart relationship. The rear panel and plurality of legs extending outwardly therefrom are a single, unitary body of material.

20 Claims, 6 Drawing Sheets

SUPPORT FRAME FOR HIGH DEFINITION FIELD MONITOR

RELATED APPLICATION

This application claims the benefit of and priority to U.S. Provisional Patent Application No. 61/624,451 filed Apr. 16, 2012, the disclosure of which is incorporated herein by reference as if set forth in its entirety.

FIELD OF THE INVENTION

The present invention relates generally to monitors and, more particularly, to field monitors.

BACKGROUND

High definition field monitors are used by video and still photography professionals to capture accurate focus, exposure, color, and composition without the strain typically encountered with small, lower quality monitors found on most DSLR and professional still and video cameras. These field monitors are typically supported by some type of chassis or frame. Conventionally, such frames are formed from injection-molded plastic or bent sheet metal. In some cases, a solid, milled aluminum shell is utilized. Unfortunately, conventional plastic and sheet metal frames may not be durable or strong enough for some field applications. In addition, solid, milled aluminum shell frames may be complex, heavy and expensive to manufacture.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a frame for a field monitor includes a front panel having an opening, and a rear panel attached to the front panel in adjacent, spaced-apart relationship to define a receptacle for receiving and supporting a monitor therein. The receptacle includes a substantially open periphery which provides access to cable ports and other field monitor controls/features. The rear panel includes opposite first and second sides and a plurality of legs extending outwardly from the first side. Each leg is attached to the front panel (e.g., via fasteners) so as to maintain the front and rear panels in adjacent, spaced-apart relationship. The rear panel has a substantially rectangular configuration with opposite first and second edge portions and opposite third and fourth edge portions. A respective one of the plurality of legs extends outwardly from an intermediate portion of each of the first, second, third and fourth edge portions. In some embodiments of the present invention, the rear panel and plurality of legs extending outwardly therefrom are a single, unitary body of material, such as aluminum.

The rear panel first side includes a plurality of monitor support pedestals extending outwardly therefrom that are configured to receive and support a monitor within the receptacle. In some embodiments of the present invention, the rear panel first side includes a plurality of reinforcing ribs formed within the surface to provide rigidity and strength. One or more apertures may be formed through the rear panel that are adapted to receive a cable port or other type of port from a field monitor disposed within the receptacle.

In some embodiments of the present invention, the front panel has a substantially rectangular configuration with opposite first and second edge portions and opposite third and fourth edge portions. In addition, the opening in the front panel is substantially rectangular. Each leg extending from the rear panel includes a proximal end portion and a distal end portion, and the proximal end portion of each leg is substantially flush with the rear panel second side. In addition, the distal end portion of each leg is substantially flush with a respective edge portion of the front panel.

The front panel second side includes a plurality of monitor support pedestals that extend outwardly therefrom. Each monitor support pedestal includes a threaded passage formed therein. A field monitor is secured to the front panel via a respective plurality of threaded fasteners, each threadingly engaged with a respective threaded passage in a respective monitor support pedestal.

In some embodiments of the present invention, the front panel first side includes a peripheral lip, and the front panel second side includes a peripheral lip. The front panel also includes a plurality of apertures formed therethrough adjacent the opening. Each aperture is sized and configured to receive a respective monitor control therethrough.

In some embodiments of the present invention, the front panel is a single, unitary body of material, such as aluminum.

In some embodiments of the present invention, the front panel second side comprises a plurality of leg support pedestals that extend outwardly therefrom. Each leg support pedestal is configured to receive a distal end portion of a respective leg from the rear panel and includes at least one threaded passage formed therein. Each rear panel leg distal end portion includes at least one bore formed therethrough and is secured to a respective leg support pedestal via at least one threaded fastener inserted through a respective bore and threadingly engaged with a respective threaded passage.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

Figure 1:
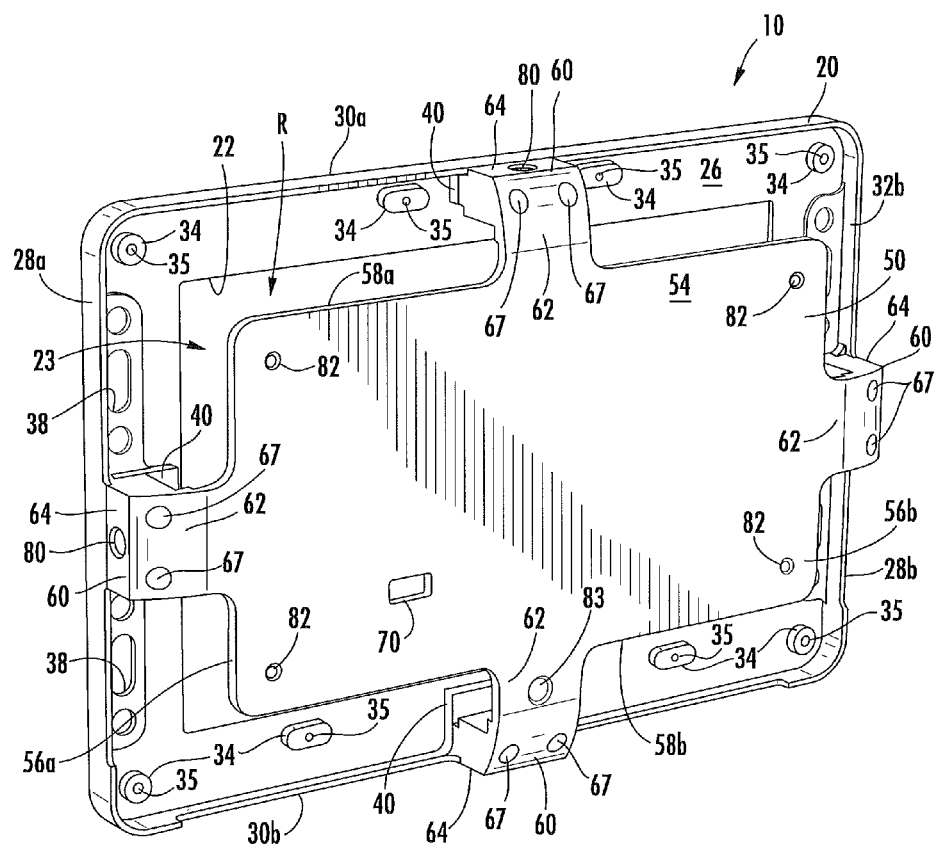
FIG. 1 is a top, rear perspective view of a frame for a field monitor, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Figure 2:
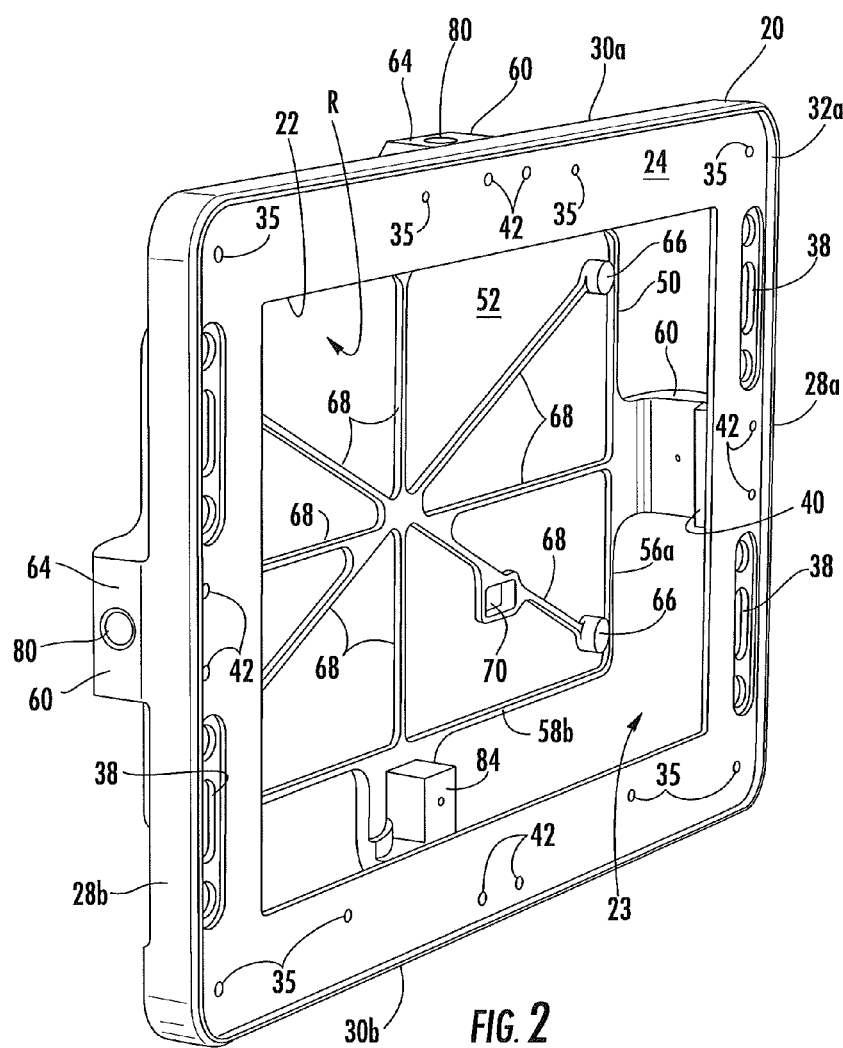
FIG. 2 is top, front perspective view of the frame of FIG. 1.
Figure 3:
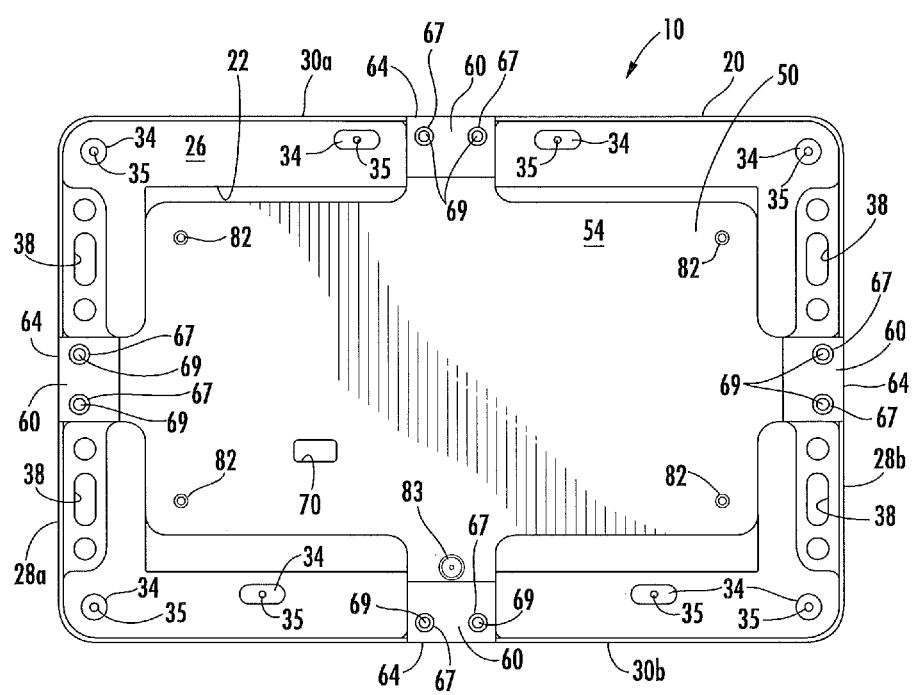
FIG. 3 is a rear plan view of the frame of FIG. 1.
Figure 4:
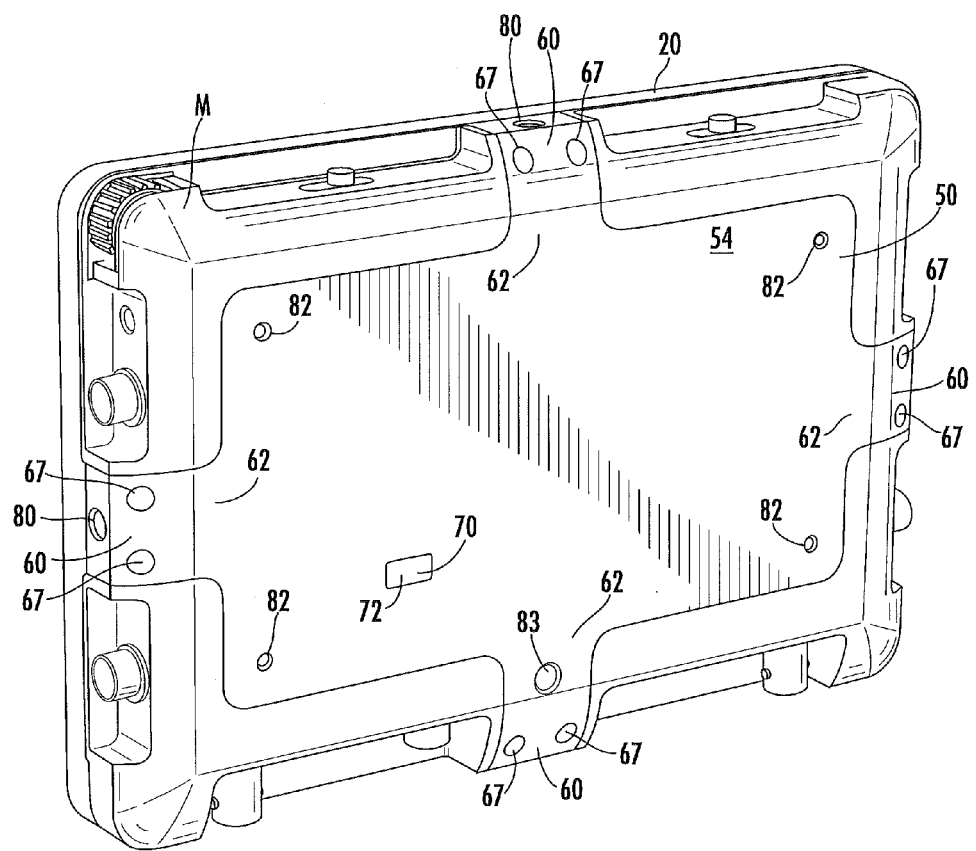
FIG. 4 is a top, rear perspective view of the frame of FIG. 1 with a field monitor supported therewithin.
Figure 5:
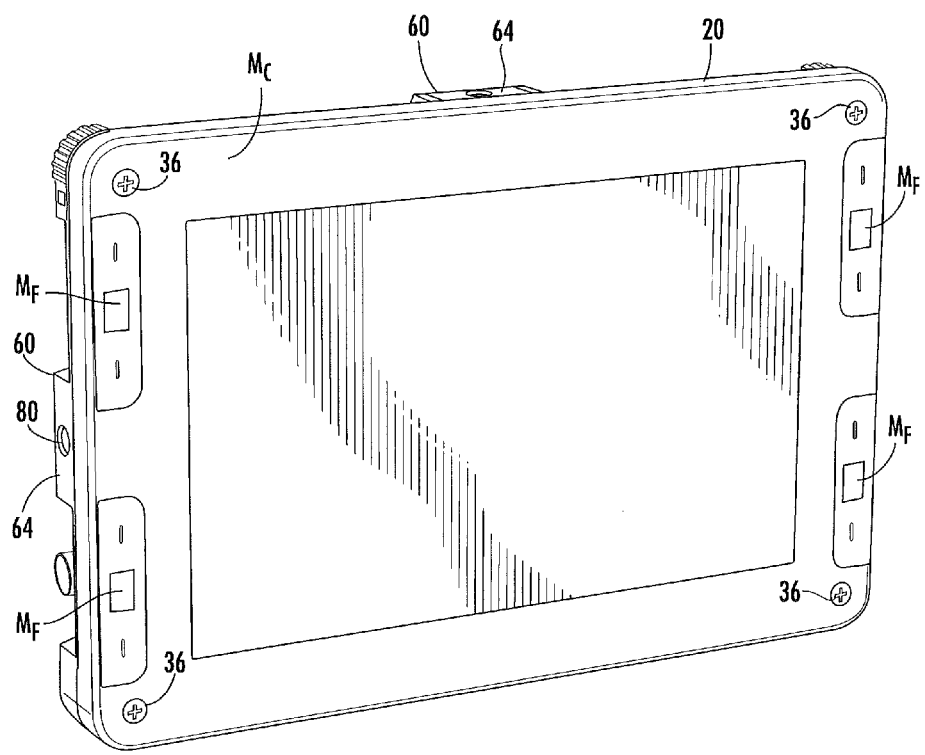
FIG. 5 is a top, front perspective view of the frame and field monitor of FIG. 4.
Figure 6:
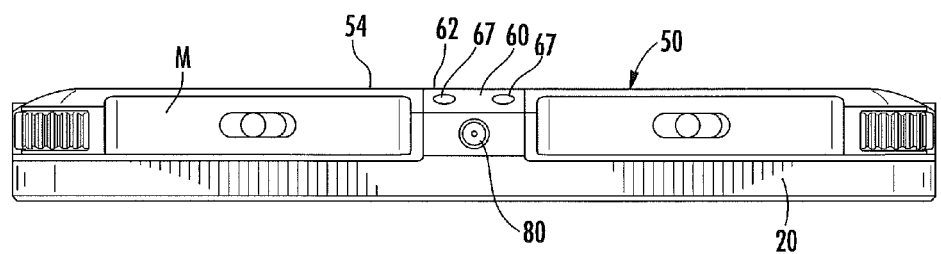
FIG. 6 is a top edge view of the frame and field monitor of FIG. 4.

Referring now to FIGS. 1-6, a frame 10 for a monitor, such as a high definition (HD) field monitor, is illustrated according to some embodiments of the present invention. The illustrated frame 10 includes a front panel 20 with a central opening 22 and a rear panel 50 attached to the front panel 20 in adjacent, spaced-apart relationship to define a receptacle R for receiving and supporting a field monitor M (FIGS. 4-5) therein. Although described in the context of a field monitor, the frame disclosed herein may be used to house, support and/or receive a variety of different devices and/or types of devices including personal electronic devices, portable electronic devices, and the like. The receptacle R has a substantially open periphery 23, as illustrated. This open periphery 23 provides access to cable ports and other field monitor controls/features, as illustrated in FIGS. 4-6.

In the illustrated embodiment, the front panel 20 has a substantially rectangular configuration with opposite first and second sides 24, 26, opposite first and second edge portions 28a, 28b and opposite third and fourth edge portions 30a, 30b. The illustrated central opening 22 has a substantially rectangular configuration. Embodiments of the present invention are not limited to a front panel 20 having a rectangular configuration or to an opening 22 therein having a rectangular configuration. In other embodiments of the present invention, the front panel 20 and/or central opening 22 can have various shapes and configurations.

In the illustrated embodiment, the front panel first side 24 has a peripheral lip 32a (FIG. 2) and the front panel second side has peripheral lip 32b (FIG. 1). As such, the front panel first, second, third and fourth edge portions each have a width that is greater than the thickness of the front panel 20. In addition, the peripheral lips 32a, 32b facilitate seating of portions of a field monitor on the first and second sides 24, 26 of the front panel 20. For example, a monitor screen cover $M_C$ (FIG. 5) may be secured to the front panel first side 24 such that the peripheral lip 32a surrounds the monitor screen cover $M_C$ such that the monitor screen cover $M_C$ is substantially flush with the peripheral lip 32a.

As illustrated in FIGS. 1 and 3, the front panel second side 26 includes a plurality of monitor support pedestals 34 extending outwardly therefrom. Each monitor support pedestal 34 comprises a threaded passage 35 formed therein that terminates in respective apertures in the front panel first and second sides 24, 26. These monitor support pedestals 34 and threaded passages 35 are utilized to secure a field monitor M to the front panel via a respective plurality of threaded fasteners, as would be understood by those skilled in the art of the present invention. For example, FIG. 5 illustrates threaded fasteners 36 utilized to secure a monitor screen cover $M_C$ to the first panel 20.

The front panel 20 includes a plurality of apertures 38 formed therethrough adjacent the central opening 22. Each aperture 38 is sized and configured to receive a respective monitor feature and/or control $M_F$ (FIG. 5) therethrough, as would be understood by those skilled in the art of the present invention.

The front panel second side 26 includes a plurality of leg support pedestals 40 extending outwardly therefrom. In the illustrated embodiment, each leg support pedestal 40 is located adjacent a respective one of the first, second, third and fourth edge portions 28a, 28b, 30a, 30b, at an intermediate portion thereof. Each leg support pedestal 40 is configured to receive a distal end portion 64 of a respective rear panel leg 60, as described below.

In the illustrated embodiment, the rear panel 50 has a substantially rectangular configuration and includes opposite first and second sides 52, 54, opposite first and second edge portions 56a, 56b, and opposite third and fourth edge portions 58a, 58b. The rectangular size of the rear panel 50 is smaller than the rectangular size of the front panel central opening 22. For example, the width of the rear panel is less than a width of the front panel central opening 22 and/or the length of the rear panel is less than a length of the front panel central opening 22.

A plurality of legs 60 extend outwardly from the first side and are attached to the front panel 20 so as to maintain the front and rear panels 20, 50 in adjacent, spaced-apart relationship. Typically, the front panel 20 and rear panel 50 are spaced apart by between about one half inch (0.5 in.) and about two inches (2.0 in.), depending upon the size of the field monitor. However, embodiments of the present invention are not limited to this range. In the illustrated embodiment, a respective one of the legs 60 extends outwardly from an intermediate portion of each of the rear panel first, second, third and fourth edge portions 56a, 56b, 58a, 58b.

Each leg 60 includes a proximal end portion 62 and a distal end portion 64. As illustrated in FIG. 6, the proximal end portion 62 of each leg 60 is substantially flush with the rear panel second side 54. As illustrated in FIG. 3, the distal end portion 64 of each leg 60 is substantially flush with a respective edge portion 28a, 28b, 30a, 30b of the front panel 20.

Each leg support pedestal 40 of the front panel 20 includes a pair of threaded passages 42 (FIG. 2) that terminate at the front panel first side 24. Each leg distal end 64 includes a respective pair of bores 67 formed therethrough. Each leg 60 is secured to a respective leg support pedestal 40 via fasteners 69 inserted through the bores 67 and threadingly engaged with threaded passages 42 (FIG. 3).

As illustrated in FIG. 2, the rear panel first side 52 includes a plurality of monitor support pedestals 66 extending outwardly therefrom for receiving and supporting a monitor M thereon. In addition, in the illustrated embodiment, the rear panel first side 52 comprises a plurality of reinforcing ribs 68 formed within the surface of the first side 52. The ribs 68 provide additional structural rigidity to the rear panel 50 and frame 10 while also helping to reduce the weight of the frame 10. In the illustrated embodiment, the rear panel 50 includes an aperture 70 formed therethrough adapted to receive a cable port (72, FIG. 4) from a field monitor M disposed within the receptacle.

In the illustrated embodiment, the rear panel 50 includes a plurality of threaded passages that facilitate attachment of the frame 10 to other devices and/or permit the attachment of various accessories to the frame 10. For example, each leg distal end 64 includes a respective threaded passage 80. The proximal end 62 of the leg 60 adjacent the lower edge portion 58b of the rear panel includes a threaded passage 83, in the illustrated embodiment. Additional material 84 is provided on this leg to provide sufficient depth of the threaded passage 83, as illustrated in FIG. 2. In addition, the rear panel second side 54 includes a plurality of threaded passages 82, as illustrated.

In some embodiments of the present invention, the rear panel 50 and legs 60 extending outwardly therefrom are a single, unitary body of material, such as aluminum. The front panel 20 may also be a single, unitary body of material, such as aluminum. The front and rear panels 20, 50 can be manufactured by metal injection molding, as well as by machining and other processes with sufficient precision. However, the front and rear panels may also be formed from various other materials having sufficient rigidity. For example, one or both of the front and rear panels 20, 50 may be formed from polymeric material.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A frame for a field monitor, comprising:
a front panel having a central opening; and
a rear panel attached to the front panel in adjacent, spaced-apart relationship to define a receptacle for receiving and supporting a field monitor therein, wherein the receptacle comprises a substantially open rectangular periphery.

2. The frame of claim 1, wherein the rear panel comprises opposite first and second sides and a plurality of legs extending outwardly from the first side, wherein each leg is attached to the front panel so as to maintain the front and rear panels in adjacent, spaced-apart relationship.

3. The frame of claim 2, wherein the rear panel has a substantially rectangular configuration with opposite first and second edge portions and opposite third and fourth edge portions, and wherein a respective one of the plurality of legs extends outwardly from an intermediate portion of each of the first, second, third and fourth edge portions.

4. The frame of claim 2, wherein the rear panel and plurality of legs extending outwardly therefrom are a single, unitary body of material.

5. The frame of claim 2, wherein the rear panel and plurality of legs extending outwardly therefrom are a single, unitary body of aluminum.

6. The frame of claim 2, wherein the front panel is a single, unitary body of material.

7. The frame of claim 2, wherein the front panel is a single, unitary body of aluminum.

8. The frame of claim 2, wherein the rear panel first side comprises a plurality of monitor support pedestals extending outwardly therefrom for receiving and supporting a field monitor thereon.

9. The frame of claim 2, wherein the rear panel first side comprises a plurality of reinforcing ribs formed therein.

10. The frame of claim 2, wherein the front panel has a substantially rectangular configuration with opposite first and second edge portions and opposite third and fourth edge portions, wherein each leg comprises a proximal end portion and a distal end portion, wherein the proximal end portion of each leg is substantially flush with the rear panel second side, and wherein the distal end portion of each leg is substantially flush with a respective edge portion of the front panel.

11. The frame of claim 2, wherein the front panel comprises opposite first and second sides, wherein the front panel second side comprises a plurality of leg support pedestals extending outwardly therefrom, wherein each leg support pedestal is configured to receive a distal end portion of a respective leg and comprises at least one threaded passage formed therein, wherein each leg distal end portion comprises at least one bore formed therethrough, and wherein each leg is secured to a respective leg support pedestal via at least one threaded fastener inserted through a respective bore and threadingly engaged with a respective threaded passage.

12. The frame of claim 2, wherein the front panel comprises opposite first and second sides, wherein the front panel second side comprises a plurality of monitor support pedestals extending outwardly therefrom, wherein each monitor support pedestal comprises a threaded passage formed therein, and wherein a field monitor is secured to the front panel via a respective plurality of threaded fasteners, each threadingly engaged with a respective threaded passage in a respective monitor support pedestal.

13. The frame of claim 1, wherein the rear panel comprises an aperture formed therethrough adapted to receive and/or provide access to a cable port of a field monitor disposed within the receptacle.

14. The frame of claim 1, wherein the front panel comprises opposite first and second sides, wherein the front panel first side comprises a peripheral lip, and wherein the front panel second side comprises a peripheral lip.

15. The frame of claim 1, wherein the front panel central opening is substantially rectangular.

16. The frame of claim 1, wherein the front panel comprises a plurality of apertures formed therethrough adjacent the central opening, each aperture sized and configured to receive a respective monitor control therethrough.

17. A frame for a field monitor, comprising:
a front panel having a substantially rectangular central opening and a plurality of apertures formed therethrough adjacent the central opening, each aperture sized and configured to receive a respective monitor control therethrough; and
a rear panel attached to the front panel in adjacent, spaced-apart relationship to define a receptacle for receiving and supporting a field monitor therein, wherein the receptacle comprises a substantially open periphery, wherein the rear panel comprises opposite first and second sides, and wherein the rear panel first side comprises a plurality of monitor support pedestals extending outwardly therefrom for receiving and supporting a field monitor thereon.

18. The frame of claim 17, wherein the rear panel and plurality of legs extending outwardly therefrom are a single, unitary body of material, and wherein the front panel is a single, unitary body of material.

19. The frame of claim 17, wherein the front panel comprises opposite first and second sides, wherein the front panel first side comprises a peripheral lip, and wherein the front panel second side comprises a peripheral lip.

20. A frame for a field monitor, comprising:
a front panel having a substantially rectangular central opening and a plurality of apertures formed therethrough adjacent the central opening, each aperture sized and configured to receive a respective monitor control therethrough; and
a rear panel attached to the front panel in adjacent, spaced-apart relationship to define a receptacle for receiving and supporting a field monitor therein, wherein the receptacle comprises a substantially open periphery, and wherein the rear panel has a substantially rectangular configuration that is smaller than the rectangular central opening.

* * * * *